3,514,595
PARTICLE BEAM MICROSCOPE IN COMBINATION WITH AN ADJUSTABLE VIEWING APPARATUS AND MAGNIFIER
Karl G. Schwarz and Winfried Rusam, Karlsruhe, Germany, assignors to Siemens Aktiengesellschaft, a corporation of Germany
Continuation of application Ser. No. 478,681, Aug. 10, 1965. This application Feb. 28, 1969, Ser. No. 804,383
Claims priority, application Germany, Aug. 17, 1964,
S 92,675
Int. Cl. G01n 23/04; H01j 37/22, 37/26
U.S. Cl. 250—49.5
8 Claims

ABSTRACT OF THE DISCLOSURE

A particle beam microscope which includes a luminescent screen mounted in a vessel portion of the microscope capable of being viewed through a window therein. An adjustable viewing apparatus and magnifier are mounted exteriorly of the microscope at different positions on a rotatable ring which surrounds the microscope and are adapted to be selectively positioned adjacent the window. The adjustable viewing apparatus comprises two objective lenses in tandem and a television camera which are all in optical alignment with the luminescent screen when the viewing apparatus is adjacent the window.

---

This application is a continuation of application Ser. No. 478,681, filed Aug. 10, 1965.

Our invention relates to particle beam apparatus such as electron microscopes.

In particular, our invention deals with the transmission of images in connection with particle beam apparatus.

For example, in an electron microscope there is situated in the vessel portion thereof a luminescent screen which receives an observable image. While the operator may observe this image directly, it is desired for many purposes to transmit the image to a distant location. It has been proposed to do this with the aid of a television camera.

An apparatus of this general type is disclosed in the copending application of O. Wolff et al., Ser. No. 456,997, filed May 19, 1965, and assigned to the assignee of the instant invention. The apparatus comprises a television camera such as a vidicon or a super-orthikon, as well as a structure which optically couples the television camera to the microscope and includes a pair of coaxial objectives arranged in tandem. The two objective have a common optical axis coinciding with an optical axis along which the signal plate of the television camera and the luminescent screen of the electron microscope are also arranged, the pair of objectives being situated between the luminescent screen and the signal plate. The pair of objectives are corrected so as to be focused at infinity and to have relatively wide apertures enabling a relatively large amount of light to pass through. The objectives are so situated with respect to each other that a telecentric light path is formed thereby. The focal lengths of the respective objectives are related to each other in accordance with the ratio of the size of the image on the screen to the optical image thrown onto the signal plate of the television camera by the optical coupling assembly.

In order to match the resolving power of the particular luminescent screen to that of the television camera, the image at the luminescent screen is transmitted to the signal plate of the video tube of the camera at a reduced scale. With a conventional luminescent screen which has a resolving power of 50µ, as well as with a conventional signal plate having a resolving power of 25µ, the ratio of the image sizes is preferably 2:1. Preferably the relatively wide apertures of the air of objectives have with respect to each other sizes which are the inverse of the focal lengths of the tandem-arranged pair of objectives.

With an optical structure of this type, the luminescent screen of the electron microscope should of course be situated at the focal plane of that one of the objectives which is nearest to the luminescent screen while the signal plate of the television camera should be located at the focal plane of that one of the objectives which is nearest to the camera. In order to achieve at the signal plate as sharp as possible a reproduction of the image at the luminescent screen, it is important, while maintaining the ratio between the image sizes, to situate the luminescent screen as precisely as possible at the focal plane of the objective nearest to the luminescent screen and to situate the signal plate as precisely as possible at the focal plane of the objective nearest to the signal plate.

It is accordingly a primary object of our invention to provide a structure which makes it possible conveniently and precisely to adjust the structure so as to secure the location of the luminescent screen and signal plate respectively at the proper focal planes of the objectives which cooperate therewith, while maintaining the predetermined ratio between the sizes of the images at the luminescent screen and the signal plate.

In addition, it is an object of our invention to provide a structure which, while it may change the relationship in space between components of the type referred to above, so as to produce at the signal plate the sharpest possible reproduction of the image at the luminescent screen, will not in any way change the relationship between the focal lengths of the pair of objectives, so that in this way the predetermined ratio between the sizes of the images at the screen and plate can be retained.

In general there are two possibilities for mounting of the television structure on the electron microscope. According to one possibility, which from a structural standpoint is more convenient, the electron microscope vessel in which the luminescent screen is situated remains unchanged and the pair of tandem-connected objectives together with the television camera are situated at the exterior of this vessel so as to be located at the outside of the vacuum which prevails within the electron microscope. However, with respect to the achievement of the highest possible quality of the transmitted image, it is better to arrange the parts so that the tandem-connected objective assembly extends into the vessel of the microscope in which the luminescent screen is situated, so that the objective which is nearest to this screen extends into the vacuum chamber which is closed by an observation window, while the objective which is nearest to the television camera is arranged outside of the vacuum chamber.

It is accordingly a further object of our invention to provide a structure which can be adjusted to produce the sharpest possible image reproduction while at the same time harmonizing with both of these principles of construction.

Thus, according to one feature of our invention an adjusting structure is connected to the television camera to adjust the latter in the direction of the optical axis of the pair of objectives, while the objective which is nearest to the television camera is fixed to the electron microscope. With this construction both of the objectives will form a single unitary assembly which can either be mounted so as to extend into the vessel in which the luminescent screen is situated or which can be mounted at the exterior of the microscope in the region of this vessel.

For the situation where the electron microscope is provided with a television structure having only the objective which is nearest to the television camera situated outside of the vessel in which the luminescent screen is located, our invention includes the further object of providing a structure for rendering only this latter objective which is nearest to the television camera adjustable along the common optical axis of the pair of objectives, while maintaining the television camera fixed to the microscope. Thus, with this construction it is possible to adjust the distance between the signal plate of the television camera and the objective which cooperates therewith. The distance between the luminescent screen and the objective nearest thereto is maintained precisely fixed at a magnitude set when the structure is manufactured.

For the situation where both of the tandem-arranged objectives and the television camera are situated outside of the vessel portion of the microscope in which the luminescent screen is located, it is an object of our invention to provide a construction where it is possible to adjust both of the objectives and the television camera as a unit, so as to avoid the necessity of separate assemblies for the pair of objectives, respectively, and thus with this arrangement the pair of objectives and the television camera will have a fixed, unchanging relationship with respect to each other. With this construction the distance between the objective nearest to the camera and the signal plate thereof will initially be set with the highest possible precision so that the signal plate is situated in the focal plane of the objective nearest thereto, and thus the desired imaging ratio is adjusted. While maintaining this distance between the assembly of objectives and the signal plate, it is possible, in accordance with our invention, to adjust an assembly which includes the pair of objectives and the television camera with respect to the luminescent screen so that the latter will be very precisely situated in the focal plane of that one of the pair of objectives which is nearest to the luminescent screen.

The objects of our invention also include the provision of a structure where only that one of the pair of objectives which is nearest to the luminescent screen is adjusted while the other objective and the television camera have a fixed relationship with respect to each other and are fixed to the microscope. This solution to the problem although effective, nevertheless is not as desirable as other solutions since it requires dividing the assembly of tandem-arranged objectives at least to the extent of rendering the objective nearest to the luminescent screen movable with respect to the other objective. In addition, because of the range of movement of the objective nearest to the luminescent screen there is the possibility of undesirable vignetting.

As has been indicated above, it is conventional for the operator to observe directly the image on the luminescent screen through a window which closes the interior of the vessel portion of the microscope off from the outer atmosphere so that a vacuum can be maintained in the interior of this vessel portion. In order to provide the operator with the option of directly observing the image on the luminescent screen or transmitting the image by way of a television structure, for example, it is a further object of our invention to provide a structure which makes direct observation on the image or transmission of the image possible at the option of the operator.

In particular, it is a further object of our invention to provide a structure which makes it very easy for the operator either to transmit the image on the luminescent screen to a location distant from the microscope or to observe the image on the luminescent screen directly by means of a suitable magnifying lens assembly.

In addition, it is an object of our invention to arrange a television camera and a magnifying lens assembly with respect to each other at locations which on the one hand will not occupy an undesirably large amount of space while on the other hand making it very convenient to use either the magnifying lens assembly or the television camera without the use of either one of these structures being hampered by the presence of the other structure.

It is furthermore an object of our invention to provide at the entrance into the tandem-connected pair of objectives, and thus at the signal plate of the television camera, an image which is rich in contrast and free of extraneous light rays, and for this purpose we provide a structure where the clearance between the tandem-connected objectives and the observation window is only great enough to provide for free movement of the assembly of the television camera and tandem-connected objectives. This is the same as saying that the objective which is nearest to the luminescent screen has a free focal intercept which is only slightly greater than the distance between the image on the luminescent screen and the outer portion of the observation window. Thus, it is a further object of our invention to provide for the objective which is nearest to the luminescent screen a focal length which is as small as possible, which is to say smaller or at least not substantially greater than its focal intercept.

The objects of our invention also include the provision of an adjusting structure which can be very easily manipulated by the operator to bring about a precise adjustment while at the same time avoiding any difficulty from the weight of the structure which is moved by the adjusting structure of our invention.

According to our invention the corpuscular ray apparatus includes a plurality of components among which are the luminescent screen, the signal plate of the television camera, and the pair of coaxial objectives situated between the screen and plate. The latter four components are arrangemented along a predetermined optical axis, and in accordance with our invention an assembly which includes at least one of these components is mounted by a suitable mounting means for movement in the direction of this predetermined optical axis, and an adjusting means is provided for moving this assembly in the direction of the optical axis so that in this way at least this one component will have its position along the optical axis adjusted.

The invention is illustrated by way of example in the accompanying drawings which form part of the application and in which.

Figure 1:
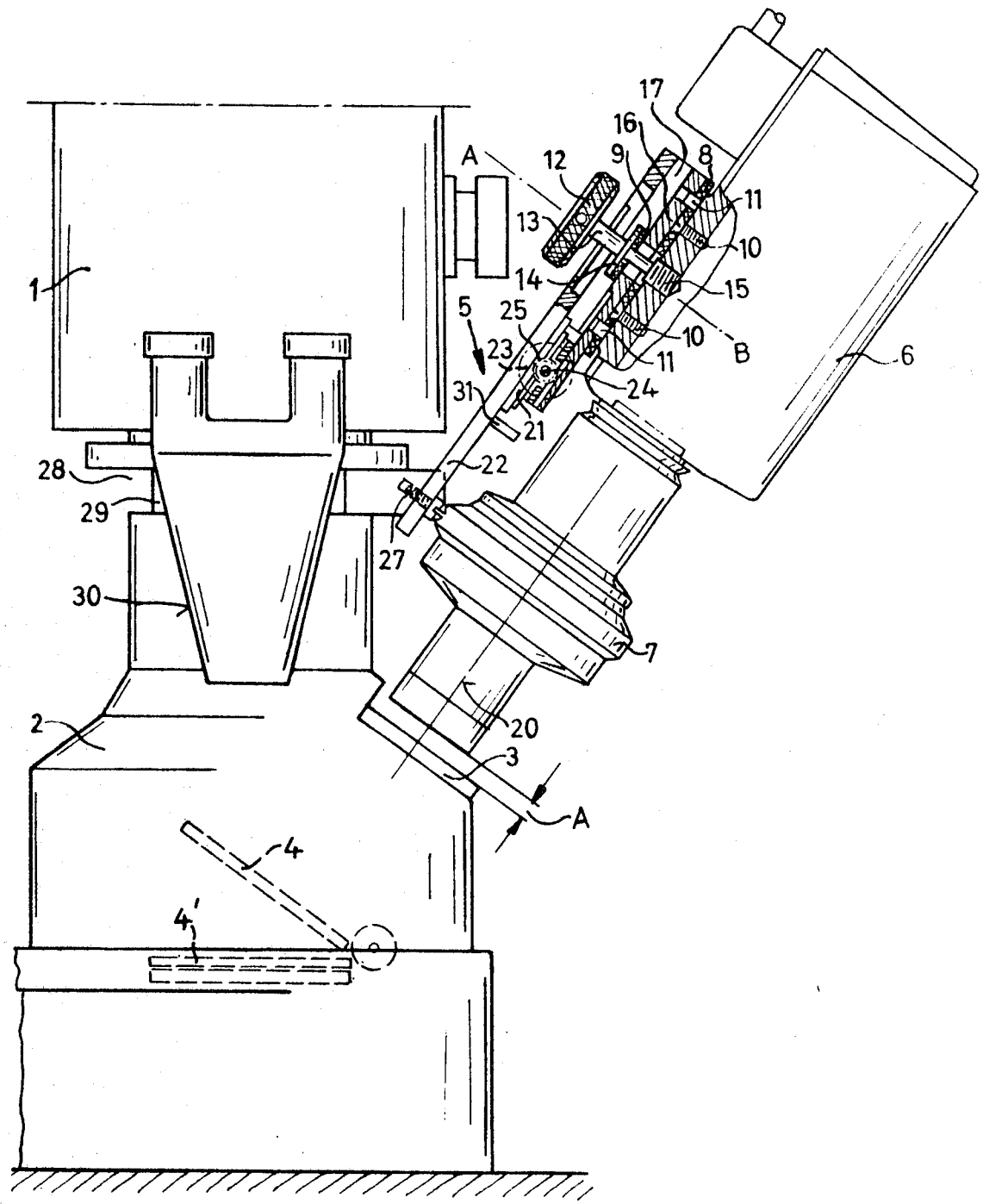
FIG. 1 is a schematic partly sectional side view of an embodiment of our invention according to which the television camera together with the pair of objectives are arranged outside of the vessel portion of the electron microscope.

Referring to FIG. 1, there is fragmentarily illustrated the columnar housing 1 of an electron microscope having an evacuated vessel portion 2 provided with an observation window 3 as well as with a tiltable luminescent screen 4 to exhibit the image which can be observed through the window 3.

A mounting means, described in detail below, supports a television camera 6 for movement along a predetermined optical axis 20, and an adjusting means 5 according to our invention is operatively connected to the adjustable assembly for adjusting the latter along the axis 20.

The television camera 6 can be a conventional television camera normally found in industry. The signal plate of the camera 6 is shown at 6' in FIG. 5. Arranged at a precisely predetermined constant distance from the television camera are a pair of objectives forming the tandem objective assembly 7 (FIG. 1) in which both of the objectives are combined to form a single structural unit.

Figure 2:
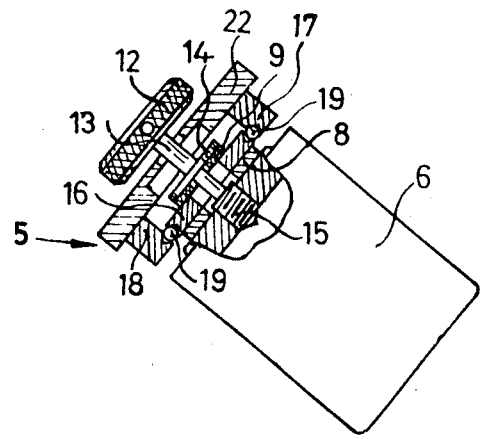
FIG. 2 is a partly sectional transverse view of the structure of FIG. 1 taken along line 2—2 of FIG. 1 in the direction of the arrows.

As may be seen from FIGS. 1 and 2, the television camera 6 is electrically insulated from the electron microscope interposed layers 8 and 9 of electrically non-conductive material at the connection between the television camera and the adjustable mounting structure therefore. The connecting elements, such as the screws 10 and pin 11, which interconnect the components are offset with respect to each other so that they cannot form any closed electrically conductive path. A fixing knob 12 forms part of a fastening member having a shank 13, a collar 14 and a threaded portion 15. Because of the particular configuration of the shank 13 and the collar 14, as well as the threaded portion 15 a releasable connection between the adjusting structure 5 and the television camera 6 is provided while maintaining the electrical insulation between the television camera and the electron microscope, as is apparent from FIG. 1. Since the television camera carries the optical assembly 7 of tandem-connected objectives, this optical assembly 7 also is connected and disconnected from the microscope by way of the fastening device 12–15.

Figure 3:
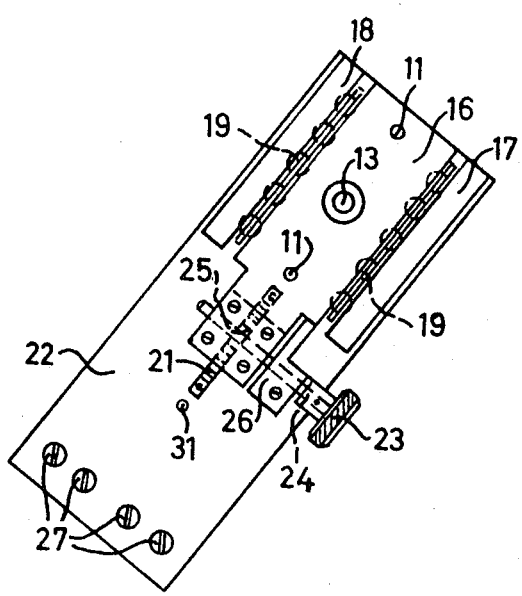
FIG. 3 is an elevation of one possible embodiment of an adjusting structure of our invention.

As is apparent particularly from FIGS. 2 and 3, the mounting means for the assembly, of components 6 and 7, for movement along the optical axis 20 includes a carriage plate 16 having side edges in the form of V-grooves each of which receives a row of ball members 19 situated in a suitable cage. The two rows of ball members 19 are respectively received also in V-grooves formed in a pair of guide tracks 17 and 18 which, together with the carriage 16 and the ball members 19, form part of the mounting means mounting the camera 6 and all of the structure carried thereby for movement in the direction of the optical axis 20. The pair of guide rails 17 and 18 of the mounting means are respectively fixedly carried by a stationary mounting plate 22 fixed by the robust bolts 27 to a supporting ring means 29 referred to in greater detail below.

The adjusting means 5 includes in the illustrated example an elongated rack 21 fixedly carried by the mounting plate 22 and a pinion 25 meshing with the rack 21 and carried by a rotary shaft 24 supported for rotation in a suitable bearing assembly carried by the carriage 16. The shaft 24 has a free end carrying a knob 23 accessible to the operator, so that by turning the knob 23 the operator will turn the pinion 25 to advance the carriage 16 along the rack 21 and thus provide an adjustment along the optical axis 20. A friction device 26 is carried by the carriage 16 and presses against the shaft 24 with a force sufficient to maintain the shaft 24 in the angular position to which it has been turned by the operator, even though the weight of the camera 6 together with all of the structure carried thereby tends to displace the adjusted elements from the adjusted position thereof. Thus, by adjusting the device 26 to provide a great enough resistance to turning of the shaft 24, the parts will be reliably maintained in their adjusted positions.

The holding ring means 29 which carries the mounting plate 22 by way of the screws 27 encircles a necked-down or annularly grooved portion 28 of the columnar housing 1 of the electron microscope. This ring 29 is turnable in the groove 28 with respect to the housing 1, and in addition to forming a support for the components 6 and 7, the holding ring means 29 serves to carry the binocular magnifying lens assembly 30. The television structure and the magnifying structure are displaced with respect to each other about the axis of the ring 29 by 90°. Thus, by turning the ring 29 the operator has the choice either of situating the television assembly in alignment with the window 3, so as to transmit the image on the screen 4 to a desired location remote from the electron microscope, or the operator can turn the ring 29 so as to situate the television assembly 6, 7 beyond the observation window 3 and instead align the magnifying lens assembly 30 therewith, to a provide a direct and magnified observation of the image on the screen 4. By situating the television assembly and the magnifying assembly at an angle of 90° from each other, the structure does not occupy an undesirably large amount of space, while at the same time neither one of these assemblies is hampered by the other assembly irrespective of which assembly the operator decides to use.

Of course, it is to be noted that with this arrangement it is also possible to provide for the ring 29 a third position where the observation window 3 is directly accessible to the operator.

The luminescent screen 4 is tiltably mounted in such a way that it can be displaced from the horizontal position 4' into the illustrated inclined position in which it is precisely normal to the optical axis 20 of the television assembly, this optical axis 20 of course coinciding with the common optical axis of the pair of objectives which form the tandem-connected optical assembly 7. Thus, by situating the screen 4 in its position normal to the optical axis 20 it automatically becomes located at the focal plane of that one of the pair of objectives of the assembly which is nearest to the luminescent screen 4.

It is to be noted that the distance A shown in FIG. 1 between the optical assembly 7 and the observation window 3 is indeed so small that a contrast-rich image transmission free of any disturbing extraneous light rays will be provided at the entrance end of the optical coupling structure 7, so that the best possible image transmission from the screen 4 to the signal plate of the television camera 6 will be provided. As has been indicated above, this result is achieved by making the clearance A just enough to provide for free turning of the structure carried by the ring 29, and in order to achieve this result the focal intercept of the objective nearest to the luminescent screen is only slightly greater than the distance between the luminescent screen and the outer frame of the observation window 3. Thus, the focal length of the objective nearest to the luminescent screen is maintained as small as possible, and, therefore, at a size which is smaller or at least not substantially greater than the focal intercept of the objective nearest to the luminescent screen.

Furthermore, it is to be noted that the adjusting structure and mounting structure are preferably carried by the supporting ring means 29 irrespective of whether part of the image-transmitting structure is situated in the interior of the vessel in which the screen 4 is situated.

Instead of using a rack and pinion type of adjusting structure for changing the position of the carriage 16, it is possible to use a threaded spindle. The use of a rack and pinion permits the structure to be quite simple inasmuch as only the pinion and the shaft connected thereto are required to extend laterally, so that the adjusting structure can be conveniently actuated from the side. However, because of the difficulties in taking care of the weight of the camera and the optical coupling unit 7 connected thereto, by way of the friction device 26 referred to above, it may be preferred to use a threaded spindle which will avoid this problem. Where a threaded spindle is used it is possible to provide a bevel-gear transmission by which the spindle can be actuated from the side through a suitable linkage, adjusting knob, or hand wheel.

Of course, certain variations are possible in the structure of our invention. For example, as is indicated in FIG. 1, it is possible to provide on the mounting plate 22 suitable stops 31 which prevent the lower end of the optical coupling structure 7 from engaging the observation window 3. In the limiting position where the bottom end of the optical coupling structure 7 is nearest to the window 3, there is just sufficient clearance, and no more, to enable the structure to be turned with the ring 29.

Figure 4:
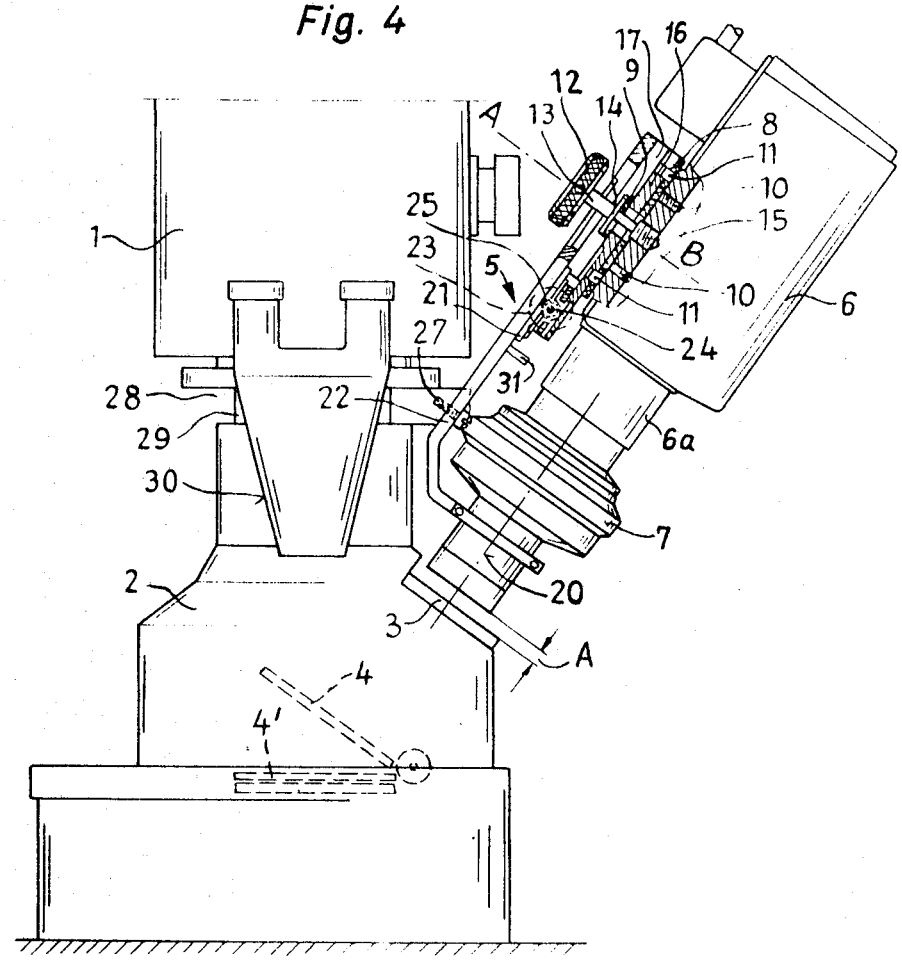
FIG. 4 is a schematic side view of a different embodiment of our invention according to which only the television camera is adjusted.

Referring now to FIG. 4, in the embodiment of the invention illustrated therein the television camera 6 is connected to the microscope in precisely the same way as described above in connection with FIG. 1. However, in this embodiment the optical assembly 7 of tandem-connected objectives is fixed to the microscope so as to be turnable with the ring 29 but otherwise immovable. Thus, the mounting plate 22 of this embodiment serves to fixedly carry the optical assembly 7 as well as to function in the manner described above to provide a guide for the carriage 16. In FIG. 4 the lower end of the mounting plate 22 has a structure which surrounds and grips the optical assembly 7. In order to accommodate the relative movement between the adjustable camera 6, which includes the signal plate which is now adjustable relative to the objective nearest thereto, the camera 6 has a tubular extension 6a which telescopically surrounds the objective at the upper end of the assembly 7 with a play sufficient to provide for the movement of the camera 6 relative to the optical coupling structure 7.

Figure 5:
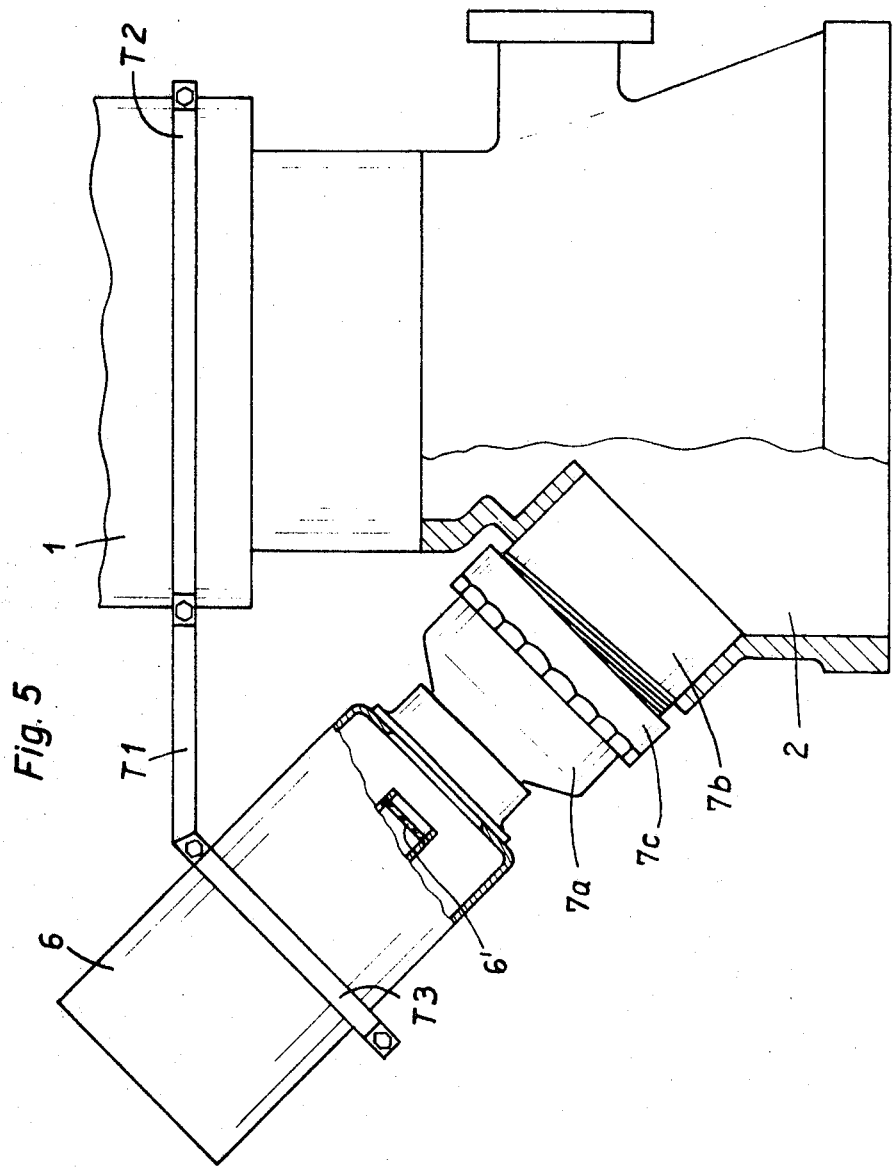
FIG. 5 is a schematic side elevation illustrating an embodiment where only one of the pair of objectives is adjustable.

In the embodiment of the invention which is illustrated in FIG. 5, only the objective 7a of the tandem-connected pair of objectives is situated outside of the vessel 2 in which the luminescent screen is situated. The objective 7b which is nearest to the luminescent screen extends into the evacuated interior of the vessel 2. In this embodiment the television camera 6 is held by a mounting structure T1 which is fixed to the columnar housing 1 of the microscope, and at its left end, as viewed in FIG. 5, the mounting structure T1 carries the gripping structure T3 which surrounds and grips the camera 6. The right portion T2 of the mounting structure surrounds and grips the microscope. With this embodiment it is only the objective 7a which is nearest to the signal plate 6' of the television camera which is adjustable along the common optical axis along which the pair of objectives together with the luminescent screen and the signal plate are arranged. The structure which mounts the objective 7a for adjustable movement includes an annular sleeve 7c which is fixed to the objective 7a, surrounding the latter, and has inner threads engaging exterior threads on the objective 7b, so that these threads form a mounting means mounting the component 7a for movement along the optical axis while the exterior of the sleeve 7c is suitably knurled so as to provide an adjusting means capable of being engaged and manipulated by the operator for turning the entire objective 7a with respect to the objective 7b so as to utilize the threads for shifting the objective 7a along the optical axis. Of course, if desired, the ring 7c can simply be carried by the objective 7a for free rotary movement relative thereto while being axially immovable relative thereto, and a suitable structure is provided to prevent turning of the objective 7a. With this construction also manual turning of the ring 7c will result in axial displacement of the objective 7a.

Figure 6:
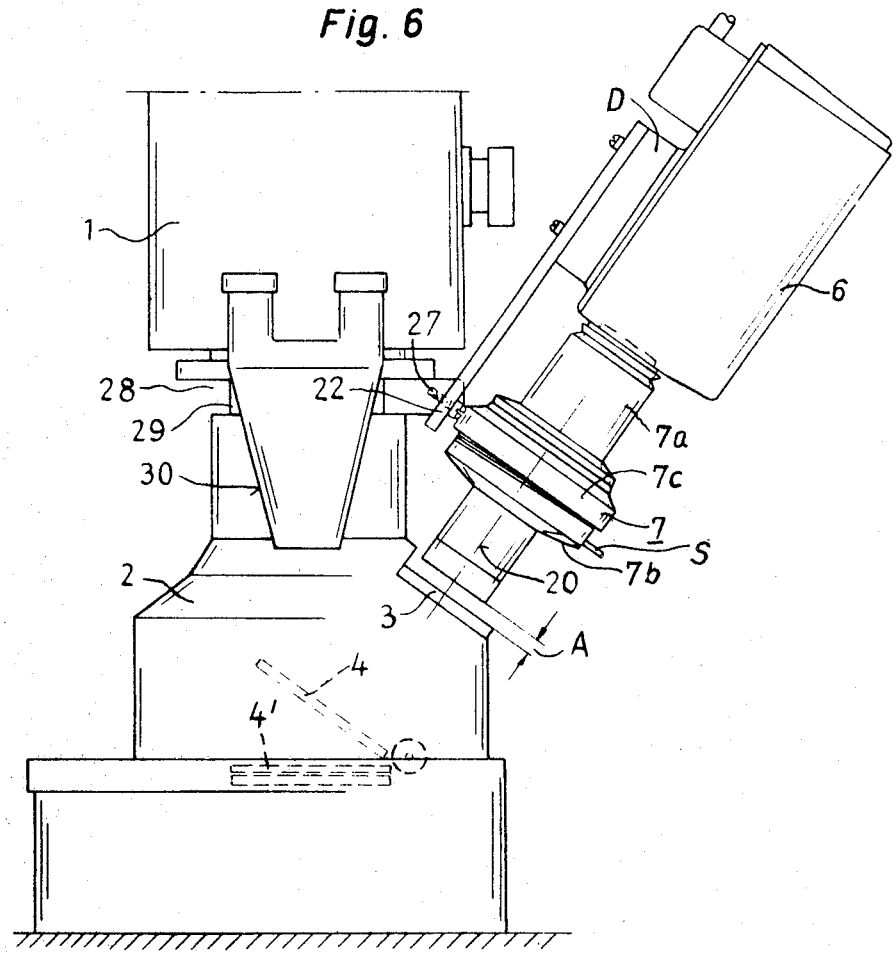
FIG. 6 shows another embodiment according to which the other objective is adjustable.

The embodiment of the invention which is illustrated in FIG. 6 again has the pair of objectives of the tandem assembly 7 and the camera 6 situated outside of the vessel in which the luminescent screen 4 is located. However, in contrast to the embodiment of FIG. 1, the camera 6 is directly fixed to the mounting plate 22, for example by being bolted thereto, and the spacer D can be made up for a plurality of layers which in part are composed of electrically non-conductive material, so that in this case also an electrically insulated mounting of the camera 6 is guaranteed. With this embodiment it is only the objective 7b which is nearest to the luminescent screen 4 which is adjustable along the optical axis 20, while the objective 7a by reason of its fixed connection with the camera 6 has an unchanged position relative to the microscope. In order to adjust the objective 7b it is mounted for movement along the optical axis, and for this purpose the upper portion of the objective 7b is provided with exterior threads which cooperate with inner threads provided at the interior of the sleeve 7c which is fixed to the objective 7a carried by the camera 6, so that by turning of the objective 7b it will be axially displaced. The adjusting structure for actually displacing the objective 7b along the optical axis 20 can simply be formed by the exterior surface of the objective 7b which can be grasped by the operator who turns the objective 7b, or, in order to facilitate the turning of the objective 7b it can be provided with a suitably profiled or knurled exterior or one or more pins S may be provided to facilitate turning of the objective 7b.

We claim:

1. Particle beam microscope assembly comprising a particle beam microscope having a longitudinal axis and including a vessel portion and luminescent screen means situated in said vessel portion in combination with a viewing apparatus for viewing an image on said screen means comprising a component consisting of two objectives axially disposed along an optical axis, mounting means for mounting said viewing apparatus on said microscope so that the optical axis inclines toward the longitudinal axis of said microsope, said apparatus having an additional component constituted by a television camera having signal plate means, said objectives forming a tandem optical lens system corrected for infinity and having respective focal planes on axially opposite sides of the system, said system being intermediate said signal plate means and said screen means so that one of said objectives is adjacent to one of said screen and plate means and the other of said objectives is adjacent to the other one of said means, whereby an image on said screen means is transmitted through said system to said signal plate means, means for holding one of said screen and plate means stationary relative to the adjacent one of said objectives and in a position so as to be in the focal plane of said adjacent objective, adjusting means mechanically engaging said mounting means for moving said one component along said optical axis so that the other one of said screen and plate means is through into mutual coincidence with the focal plane of the adjacent one of said objectives, said microscope having a columnar housing joined with said vessel portion, annular ring means engaging and surrounding said housing, said ring means carrying said mounting means, and said mounting means carrying said adjusting means, said vessel portion having an observation window for observing an image on said screen, said ring means being rotatable relative to said housing, said pair of objectives together with said camera of which said plate means forms a part being mounted on said mounting means, the latter being without said vessel portion, whereby said mounting means and said pair of objectives together with said camera are movable about said housing with said ring means to and from a position where said plate means and said objectives are in optical alignment with said window and said screen along said optical axis, said window being intermediate said objectives and said screen, and a magnifying means for observing said image on said screen, means for holding said magnifying means on said ring means so as to be angularly displaced on said ring means from said mounting means, whereby said magnifying means is movable about said housing with said ring means to a position optically aligned with said window and said mounting means being thereby angularly displaceable to a location out of optical alignment with said window.

2. In a microscope assembly according to claim 1, said pair of objectives being mounted on said mounting means so as to be separated from said window along said optical axis by a space which is not substantially greater than the minimum space required to provide a free turning movement of said objectives relative to said window.

3. In a microscope assembly according to claim 2, said camera means and said pair of objectives being mounted on said mounting means so as to position the plate of said camera and said objectives in optical alignment with said window and said screen along said optical axis, one of said objectives being adjacent said window, and said one objective having a focal length and a focal intercept, said focal length being not substantially greater than said focal intercept.

4. In a microscope assembly according to claim 3, said angular displacement being substantially ninety degrees.

5. In a microscope assembly according to claim 1, said screen and said plate means having respective images of different sizes, the size ratio with respect to each other being approximately two to one.

6. In a microscope assembly according to claim 1, said mounting means including a carriage mounted thereon for movement in the direction of said optical axis, said adjusting means being mechanically engaged with said carriage for moving the latter.

7. In a microscope assembly according to claim 6, said adjusting means including a rack parallel to said axis and fixed to said mounting means, and a rotatable pinion carried by said carriage and meshing with said rack, so that rotation of said pinion will produce a movement of said carriage in the direction of said optical axis.

8. In a microscope assembly according to claim 1, electrical insulating means being disposed intermediate said mounting means and said camera for electrically insulating said camera from said mounting means and said microscope.

References Cited

UNITED STATES PATENTS 2,894,160  7/1959  Sheldon.

FOREIGN PATENTS 403,098  4/1943  Italy.
849,544  11/1939  France.

WILLIAM F. LINDQUIST, Primary Examiner